US006582884B1

(12) United States Patent
Myers

(10) Patent No.: US 6,582,884 B1
(45) Date of Patent: Jun. 24, 2003

(54) COATED OPTICAL DISKS

(75) Inventor: Timothy E. Myers, Cincinnati, OH (US)

(73) Assignee: Borden Chemical, Inc., Columbus, OH (US)

( * ) Notice: Subject to any disclaimer, the term of this patent is extended or adjusted under 35 U.S.C. 154(b) by 0 days.

(21) Appl. No.: 09/242,553

(22) PCT Filed: Jun. 9, 1998

(86) PCT No.: PCT/US98/12153

§ 371 (c)(1),
(2), (4) Date: Feb. 18, 1999

(87) PCT Pub. No.: WO98/58373

PCT Pub. Date: Dec. 23, 1998

Related U.S. Application Data

(60) Provisional application No. 60/050,231, filed on Jun. 19, 1997.

(51) Int. Cl.[7] ............................................. G11B 7/24
(52) U.S. Cl. .................. 430/273.1; 430/945; 430/271.1; 430/320; 269/275.5; 428/64.4; 428/64.7
(58) Field of Search ..................... 369/275.5; 430/273.1, 430/275.1, 271.1, 945, 320; 428/64.4, 64.7

(56) References Cited

U.S. PATENT DOCUMENTS

| | | |
|---|---|---|
| 4,164,486 A | 8/1979 | Kudo et al. ............. 204/159.16 |
| 4,188,433 A | 2/1980 | Dijkstra et al. .............. 428/913 |
| 4,268,575 A | 5/1981 | Shinozaki et al. ........... 428/913 |
| 4,360,820 A | 11/1982 | Forster et al. ............... 430/945 |
| 4,363,844 A | 12/1982 | Lewis et al. ................. 369/286 |
| 4,410,978 A | 10/1983 | vanden Broek et al. .... 369/284 |
| 4,416,750 A | 11/1983 | Murphy et al. ......... 204/159.19 |
| 4,446,549 A | 5/1984 | Lippits et al. ............... 369/284 |
| 4,477,328 A | 10/1984 | Broeksema et al. ... 204/159.23 |
| 4,481,093 A | 11/1984 | Murphy et al. ......... 204/159.19 |
| 4,532,021 A | 7/1985 | Murphy et al. ......... 204/159.19 |
| 4,584,259 A | 4/1986 | Mayer et al. ............. 430/273.1 |
| 4,650,743 A | 3/1987 | Galloway ................. 430/278.1 |
| 4,652,498 A | 3/1987 | Wolf et al. .................. 428/461 |
| 4,668,550 A | 5/1987 | Tajima et al. ............ 430/270.1 |
| 4,745,003 A * | 5/1988 | Sirkoch et al. .............. 427/162 |
| 4,807,220 A | 2/1989 | Miyai et al. ................. 369/286 |
| 4,814,257 A | 3/1989 | Galloway ................. 430/278.1 |
| 4,847,132 A | 7/1989 | Takao et al. ................. 428/913 |
| 4,948,703 A | 8/1990 | Falcone et al. ........... 430/281.1 |
| 5,002,813 A | 3/1991 | Nakayama et al. ......... 430/945 |
| 5,128,387 A | 7/1992 | Shustack ...................... 522/92 |
| 5,128,391 A | 7/1992 | Shustack ...................... 522/92 |
| 5,161,150 A | 11/1992 | Namba et al. ........... 369/275.4 |
| 5,175,030 A | 12/1992 | Lu et al. ....................... 428/30 |
| 5,279,877 A | 1/1994 | Uchiyama et al. .......... 369/283 |
| 5,453,975 A | 9/1995 | Ohta et al. ................ 369/275.1 |
| 5,490,131 A | 2/1996 | Ohta et al. ................ 369/275.5 |
| 5,573,831 A | 11/1996 | Suzuki et al. .............. 428/64.1 |
| 5,663,211 A | 9/1997 | Kominami et al. ............ 522/8 |

FOREIGN PATENT DOCUMENTS

| | | |
|---|---|---|
| DE | 3932460 | 4/1990 |
| EP | 0507633 | 10/1992 |
| EP | 0768353 | 4/1997 |
| JP | 57-113432 | * 7/1982 |
| JP | 4-364239 | 12/1992 |
| JP | 5-117332 | 5/1993 |
| JP | 7-062043 | * 3/1995 |
| JP | 7-316468 | 12/1995 |
| JP | 8-063787 | * 3/1996 |
| WO | WO 9731372 | 8/1997 |

OTHER PUBLICATIONS

Translation of DE 3932460.*
Machine translation of JP 07–062043 from JPO website.*
Derwent machine assisted translation of JP 07–062043.*
HDODA Monomer Specification Sheet (Undated).
Ebecryl® 168 Specification Sheet (Dec. 12, 1995).
Tego® Rad Product Sheet (Undated).

* cited by examiner

*Primary Examiner*—Martin Angebranndt
(74) *Attorney, Agent, or Firm*—Dinsmore & Shohl LLP

(57) ABSTRACT

Optical disks comprise a substrate, a metallized layer and a coating formed from a radiation-curable composition. The radiation-curable composition comprises a first component selected from the group consisting of alkanediol diacrylates, alkanediol dimethacrylates, alkene glycol diacrylates, alkene glycol dimethacrylates, and mixture thereof, and a second component comprising an acrylate- or methacrylate-containing alkoxylated bisphenol A compound. The compositions further include a photoinitiator and an adhesion promoter for promoting adhesion of the coating to the metallized substrate.

24 Claims, No Drawings

COATED OPTICAL DISKS

This application claims the benefit of Provisional application No. 60/050,231 filed Jun. 19, 1997.

FIELD OF THE INVENTION

The present invention is directed to optical discs comprising a substrate, a metallized layer and a coating, and more particularly to such optical discs wherein the coating is formed from a radiation-curable composition and has an advantageous combination of physical properties.

BACKGROUND OF THE INVENTION

Optical disk technology is well known in the art. Generally, in the formation of an optical storage disk such as a compact disk (CD), a molten transparent plastic is injection molded to form a substrate. On one surface of the substrate, a replica of pits and lands contained in the master mold is formed. A highly reflective layer of metal, for example, gold, copper, silver or aluminum, is applied to the substrate surface which contains the pits and lands to allow the surface to reflect a laser beam of an optical disk reader such as a CD player. The reflective layer is commonly made of aluminum and generally is applied at a thickness of about 50 to 100 nanometers by vacuum deposition or the like. Conventionally, the metallized substrate is then provided with an ultraviolet (UV) curable coating by spin coating, electro-spray techniques, vacuum deposition, or the like. Typically, when the coating is applied by spin coating, a bead of a UV curable coating is applied to the center inner diameter of the metallized substrate as the substrate is rotated to coat the entire surface. The coating is then cured and may be subsequently printed if desired. Generally, the UV cured coating protects the metallized substrate from abrasion and humidity.

The Wolf et al U.S. Pat. No. 4,652,498 discloses an optical medium comprising a transparent substrate having an information-bearing surface, a specularly reflective layer and a protective layer formed from a polymeric network of ethylenically unsaturated ingredients such as polyacryloyl and polymethyacryloyl materials. A compound that provides phosphoric acid functionality is also included. The Namba et al U.S. Pat. No. 5,161,150 discloses optical recording discs having a protective layer formed of a radiation-curable compound and a photo-polymerization sensitizer. Suitable radiation-curable compounds are disclosed as including oligo ester acrylates used in combination with radiation-curable monomers, examples of which include various acrylates, diacrylates and triacrylates. The Dijkstra et al U.S. Pat. No. 4,188,433 discloses optical disks including a cover layer formed from an ultraviolet-curing lacquer containing a protic mixture of acrylic acid esters. Epoxy acrylates and urethane acrylates are also disclosed as suitable.

Generally, conventional UV-curable coating compositions have provided optical disks such as CD's with varying degrees of protection against abrasion and humidity. It is also important that the cured coating composition remains colorless and transparent, is easily printable and may be produced at relatively low cost. Those skilled in the art will recognize that not only are the UV coating composition's final physical properties important in providing an acceptable optical disk product, various properties of the uncured composition are also important. For example, the uncured composition must exhibit a low viscosity and good flow to provide good, uniform coatings on the metallized substrate prior to cure. The cure speed of the coating composition is also important in providing a product which may be readily mass produced. In many conventional coating compositions, these desired features compete with one another so that improving one property, for example the viscosity of the uncured composition, disadvantageously effects another property, for example the hardness of the cured composition. Accordingly, there is a continuing need to develop coating compositions for optical disks which optimize these and additional, sometimes competing, requirements.

SUMMARY OF THE INVENTION

Accordingly, it is an object of the present invention to provide optical disks which overcome disadvantages of the prior art. It is a more specific object of the present invention to provide optical disks which include a coating formed from a radiation-curable composition which provides an advantageous combination of properties. It is a further object of the invention to provide optical storage disks such as compact disks which exhibit an advantageous combination of physical properties. It is yet an additional object to provide optical disks which may be produced at an improved rate as compared with conventional optical disk products.

These and additional objects are provided by the optical disks according to the present invention. More particularly, the disks comprise a substrate, a metallized layer and a coating which is formed from a radiation-curable composition. In one embodiment, the radiation-curable composition comprises a first component selected from the group consisting of alkanediol diacrylates, alkanediol dimethacrylates, alkene glycol diacrylates, alkene glycol dimethacrylates, and mixtures thereof, and a second component comprising an acrylate- or methacrylate-containing alkoxylated bisphenol A compound. The radiation-curable compositions further include a photoinitiator which initiates curing of the first and second components to form a hard protective coating, and an adhesion promoter for promoting adhesion of the coating to the disk, for example to the metallized layer. The adhesion promoter comprises acrylated sulfonic acid, methacrylated sulfonic acid, acrylated sulfonic acid anhydride, methacrylated sulfonic acid anhydride, acrylated carboxylic acid, methacrylated carboxylic acid, acrylated carboxylic acid anhydride, methacrylated carboxylic acid anhydride, acrylated phosphoric acid, methacrylated phosphoric acid, or mixtures thereof.

The optical disks according to the present invention containing a coating formed from the described radiation-curable compositions exhibits a good combination of physical properties, including good hardness, good water resistance and good colorless transparency. Additionally, the radiation-curable compositions used to form the coating in the optical disks of the present invention are easily applied to fully and uniformly coat the metallized substrate and are quickly cured to facilitate mass production of the optical disks.

These and additional objects and advantages will be more fully apparent in view of the following detailed description.

DETAILED DESCRIPTION

The optical disks according to the present invention comprise a substrate, a metallized layer and a coating. Typically, the substrate is formed by injection molding a transparent plastic in a mold, one side of which mold contains a master stamper. In accordance with procedures well known in the compact disk manufacturing art, the master stamper may be formed with microscopic pits and lands which correspond with a recorded signal, whereby one surface of the substrate resulting from the injection molding contains a replica of the pits and lands contained on the master. Typically, a center hole is punched out of the disk substrate as the substrate is ejected from the molding machine. In one embodiment, the transparent plastic which is used to form the disc substrate comprises polycarbonate, various commercial forms of which have been specifically designed for use in producing compact disks and are readily commercially available.

The metallized layer is typically formed on the surface of the substrate which contains the microscopic pits and lands, thereby rendering the pit and land-containing surface reflective to a light beam, for example a laser beam of the type in conventional CD players. The metallized layer may be formed of any suitable reflective metal. Gold, copper, silver and aluminum are preferred owing to their highly reflective properties, with aluminum being particularly preferred. The metallized layer is typically formed by vacuum deposition, although other techniques known in the art may be employed, and at a thickness of about 50 to 100 nanometers, although the thickness may vary depending on the specific intended use of the disk.

The optical disc coating is formed from a radiation-curable composition and preferably is formed on the metallized layer. The radiation-curable composition from which the coating is formed comprises a first component selected from the group consisting of alkenediol diacrylates, alkenediol dimethacrylates, alkeneglycol diacrylates, alkeneglycol dimethacrylates and mixtures thereof, and a second component comprising an acrylate or methacrylate-containing alkoxylated bisphenol A compound. These components, together with the photoinitiator and adhesion promoter combine to provide compositions which cure quickly to form uniform coatings having good hardness and water resistance. The cured coating compositions are transparent and colorless, further contributing to their advantageous use in the optical disks of the present invention.

The alkane and/or alkene moiety of the first component included in the radiation-curable compositions preferably has from about 2 to about 10 carbon atoms, or may comprise a polymeric moiety having a repeating unit containing from about 2 to about 10 carbon atoms. Examples of the first component suitable for use in the radiation-curable compositions include, but are not limited to, 1,3-propanediol diacrylate or dimethacrylate, 1,4-butanediol diacrylate or dimethacrylate, 1,6-hexanediol diacrylate or dimethacrylate, diethylene glycol diacrylate or dimethacrylate, triethylene glycol diacrylate or dimethacrylate, polyethylene glycol diacrylate or dimethacrylate, tripropylene glycol diacrylate or dimethacrylate, and the like. Generally, this component contributes to the low viscosity of the radiation-curable compositions from which the optical disk coating is formed and contributes to the continuous and uniform coverage which the coating provides on the metallized substrate. In a preferred embodiment, the first component comprises 1,6-hexanediol diacrylate, alone or in combination with an additional alkanediol diacrylate, alkanediol dimethacrylate, alkeneglycol diacrylate or alkenediol dimethacrylate.

The second component included in the radiation-curable compositions from which the optical disk coatings are formed comprises a compound generally of the formula:

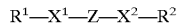

wherein each of $R^1$ and $R^2$ is individually a radiation-curable functional group, each of $X^1$ and $X^2$ is individually an alkyleneoxy group having from about 2 to about 40 carbon atoms and includes an oxygen atom linkage to Z, and Z is a hydrocarbon group having from about 5 to about 40 carbon atoms and contains at least one cyclic group. The second component contributes to the fast curing of the radiation-curable compositions and contributes to the good hardness of the optical disk coating. In a particularly preferred embodiment, the second component comprises ethoxylated bisphenol A diacrylate.

The amounts of the first and second components included in the radiation-curable compositions may vary in order to optimize the properties of a particular combination of components, for example to optimize the viscosity and cure speed of the compositions and the hardness, water resistance and colorless transparency of cured coatings formed therefrom. In this regard, it is preferred that the viscosity of the radiation-curable composition is in the range of from about 10 to about 200 cps, more preferably from about 30 to about 70 cps, as measured according to ASTM-D-2196. In a further preferred embodiment, the radiation-curable composition can be effectively cured using ultraviolet light at a level of about 300 mJ/cm$^2$ in less than about 2 seconds, and more preferably in less than about 1 second. Once the radiation-curable compositions are applied to the metallized substrate and cured, it is preferred that the resulting coating exhibits a pencil hardness of at least B, and more preferably of at least HB, as measured according to ASTM-D-3363-74. It is also preferred that the cured compositions, which are transparent and colorless, i.e., non-yellowing, exhibit APHA color of from about 0 to about 100, as measured according to ASTM-D-1209.

Preferably, the radiation-curable compositions comprise from about 20 to about 70 weight percent of the first component and from about 20 to about 70 weight percent of the second component. More preferably, the radiation-curable compositions comprise from about 30 to about 60 weight percent of the first component and from about 30 to about 60 weight percent of the second component in order that the compositions and the cured coatings produced therefrom have an advantageous combination of the aforementioned properties.

In a further embodiment of the invention, the radiation-curable compositions may include one or more additional reactive acrylate components, for example acrylates or methacrylates containing polyols, or compounds derived therefrom, and/or urethane acrylates or methacrylates. Acrylate and methacrylate oligomers of this type which are UV curable are well known in the art and commercially available and include, for example, trimethylol propane triacrylates, pentaerythritol-containing acrylates such as pentaerythritol tetracrylate, neopentyl glycol (PO) diacrylate and dipentaerythritol monohydroxy pentacrylate, di-trimethyolpropane tetracrylate, and the like. Urethane acrylate components are also suitable for use as the additional reactive acrylate component, including isocyanurate mono-, di- or tri-acrylate components, or mixtures thereof. When the radiation-curable compositions include at least one additional reactive acrylate component in combination with the first and second components, the content of one or both of the first and second components can be reduced. In a preferred embodiment in which an additional reactive acrylate component is employed, the compositions comprise from about 20 to about 70 weight percent of the first component, from about 5 to about 40 weight percent of the second component and from about 10 to about 50 weight percent of the additional reactive acrylate component or components. More preferably, these radiation-curable compositions comprise from about 30 to about 60 weight percent of the first component, from about 10 to about 30 weight percent of the second component, and from about 20 to about 40 weight percent of the additional reactive acrylate component or components.

The radiation-curable compositions further include a photoinitiator in order to initiate curing of the compositions, particularly the first and second components, in response to radiation exposure. The compositions according to the present invention are advantageously UV curable. Various photoinitiators are known in the art and may be employed in the radiation-curable compositions of the present invention. Examples of photoinitiators suitable for use in the compositions of the present invention include, but are not limited to, benzoin or alkyl ethers thereof such as the benzophenones, phenyl methyl ketone (acetophenone), substituted acetophenones, anthraquinones, polynuclearquinones, disulfides or benzil. In a preferred embodiment, the photoinitiator comprises benzophenone, an acetophenone, substituted or unsubstituted, or a mixture thereof, and more preferably comprises a substituted acetophenone. The photoinitiator is included in the radiation-curable compositions in an amount sufficient to initiate curing of the first and second components. Preferably, the photoinitiator is included in an amount of from about 2 to about 15 weight percent of the composition and more preferably in an amount of from about 5 to about 12 weight percent of the composition, and further preferable in an amount of from about 8 to about 10 weight percent of the composition.

The radiation-curable compositions from which the optical disk coatings are formed further include an adhesion promoter for promoting adhesion of the coating to the disk, particularly the metallized substrate of the optical disk. As a result, the optical disks of the invention exhibit improved coating properties, thereby increasing the durability of the optical disks. Generally, the adhesion promoter comprises an organofunctional acidic compound. Preferably, the adhesion promoter comprises acrylated sulfonic acid, methacrylated sulfonic acid, acrylated sulfonic acid anhydride, methacrylated sulfonic acid anhydride, acrylated carboxylic acid, methacrylated carboxylic acid, acrylated carboxylic acid anhydride, methacrylated carboxylic acid anhydride, acrylated phosphoric acid, methacrylated phosphoric acid, or mixtures thereof. The acrylate or methacrylate moiety of the adhesion promoter is believed to increase the compatibility of the adhesion promoter with the first and second components. The adhesion promoter is included in the radiation-curable compositions in an amount sufficient to improve adhesion of the cured compositions to the adjacent layer of the optical disk, commonly the metallized substrate. In a preferred embodiment, the adhesion promoter is included in an amount of from about 0.01 weight percent to about 1 weight percent of the radiation curable composition. More preferably, the adhesion promoter is included in an amount of from about 0.05 weight percent to about 0.5 weight percent, and further preferable in an amount of from about 0.05 weight percent to about 0.3 weight percent of the curable composition. In a further preferred embodiment, the adhesion promoter comprises an acrylated phosphoric acid or a methacrylated phosphoric acid, or a mixture thereof.

The radiation-curable compositions from which the optical disk coatings are formed may further include one or more conventional additives which do not materially effect the optimal combination of properties provided by the aforementioned essential components. For example, the compositions may optionally include a flow promoter in order to promote the radiation curable compositions' ability to quickly, completely and uniformly coat a metallized substrate to which the composition is applied. Suitable flow promoters comprise reactive silicone acrylate and methacrylate compounds, high molecular weight acrylic compounds and the like which are commercially available. Any such flow promoter, if included, is employed in a relatively low amount so as not to disadvantageously effect the optimal combination of physical properties of the radiation-curable coating compositions and the cured coatings formed therefrom. In a preferred embodiment, a flow promoter is included in the radiation-curable compositions in an amount of up to about 0.5 by weight percent of the composition, and more preferably in an amount of from about 0.01 to about 0.3 weight percent.

The radiation-curable compositions are prepared using conventional processing techniques. Generally, if any of the acrylate or methacrylate components are in a solid form, they are liquefied by heating and then mixed together with the remaining components. The resulting liquid mixture may be filtered if necessary, for example through a 0.45 um filter or the like, before application to the metallized substrate. The radiation-curable compositions may be applied to the metallized substrate in accordance with any of the techniques well known in the art. For example, the radiation-curable compositions may be applied using spin coating techniques, electro-spray techniques or vacuum deposition. Preferably and conventionally, the radiation-curable compositions are applied to the metallized substrate using spin coating techniques known in the art. The compositions according to the present invention are advantageously of a viscosity which allows spin coating techniques to be used to apply the compositions and obtain thorough, uniform coating on the disks, commonly on the metallized substrate.

In accordance with conventional techniques, the composition may be applied to the disk using a syringe, preferably including an in-line filter. After application of the composition, the disk is spun to distribute the composition across the surface of the disk in a thorough and uniform manner. The coated disk may then be exposed to radiation to cure the composition and form a hard protective coating. The uncured composition of the present invention may be cured using any suitable form of radiation, for example electron beam radiation or ultraviolet radiation. It is preferred that the composition be photocurable, i.e., curable with ultraviolet radiation. Various sources of UV radiation are suitable, including, but not limited to, electric powered arc lamps, such as medium pressure or high pressure mercury lamps, and electrodeless lamps such as H-type, D-type or V-type metal halide lamps. As an example, a UV radiation source operating at wave lengths of from about 240 to about 450 nm and an energy of from about 200 to about 450 mJ/cm$^2$ is suitable. Once the radiation-curable compositions are cured, the resulting coating may be printed on with ink as desired. The coatings according to the present invention formed from the radiation-curable compositions as described suitably accept ink printing thereon.

The detailed description of the optical disks of the present invention has indicated that typically the disks are of the CD type. Also within the scope of the present invention are optical discs, inter alia, of the CD-R, CD-ROM and DVD formats.

The optical disks according to the present invention are further demonstrated by the following Example. In the Example, and throughout the present specification, all parts and percentages are by weight, unless otherwise specified.

EXAMPLE

With reference to Table I, radiation-curable compositions were prepared from the indicated components using the recited weight percentages:

TABLE I

Radiation Curable Compositions

| Component, wt. % | A | B |
|---|---|---|
| 1,6-Hexanediol diacrylate | 46.75 | 40.75 |
| Ethoxylated bisphenol A diacrylate | 13.00 | 50.00 |
| Tris(2-hydroxyethyl)isocyanurate triacrylate | 31.00 | — |
| Irgacure 184[1] | 9.00 | 9.00 |
| Ebecryl 168[2] | 0.15 | 0.15 |
| Silicone acrylate flow promoter | 0.10 | 0.10 |

[1]Photoinitiator comprising 1-hydroxycyclohexyl phenyl ketone
[2]Adhesion promoter comprising carboxylic/phosphoric acid methacrylate In preparing composition A identified above, the isocyanurate triacrylate component was first heated for 24 hours at about 65° C. to melt the component and facilitate its use. The components of each composition A and B were added to a blend tank in the order set forth in Table 1. Shear was then initiated and the temperature of the blend tank was raised to about 56° C. The compositions were maintained under these conditions for approximately one hour, and were then filtered through a 0.45 micron filter in preparation for application to optical disk metallized substrates. Compositions A and B were measured as exhibiting viscosities of 52.4 cps and 63.5 cps according to ASTM-D2196. The compositions were cured at 300 mJ/cm$^2$ and determined to exhibit a pencil hardness of B and HB, respectively, according to pencil hardness test ASTM-D3363-74. Thus, the compositions and the cured products produced therefrom exhibited an advantageous combination of properties.

This example is set forth to illustrate a specific embodiment of the invention and is not intended to be limiting thereof. Additional embodiments and advantages of the present invention will be apparent to one of ordinary skill in the art.

What is claimed is:

1. An optical disc, comprising a substrate, a metallized layer and a coating, the coating being formed from a radiation-curable composition comprising from about 30 to about 70 weight percent of a first component selected from the group consisting of alkanediol diacrylates, alkanediol dimethacrylates, alkene glycol diacrylates, alkene glycol dimethacrylates, and mixtures thereof, from about 20 to about 70 weight percent of an acrylate- or methacrylate-containing alkoxylated bisphenol A compound as a second component, a photoinitiator and from about 0.01 to about 1 weight percent of an adhesion promoter for promoting adhesion of the coating to the disc, the adhesion promoter comprising acrylated sulfonic acid, methacrylated sulfonic acid, acrylated sulfonic acid anhydride, methacrylated sulfonic acid anhydride, acrylated carboxylic acid methacrylated carboxylic acid, acrylated carboxylic acid anhydride, methacrylated carboxylic acid anhydride, acrylated phosphoric acid, methacrylated phosphoric acid, or mixtures thereof.

2. An optical disc as defined by claim 1, wherein the radiation curable composition comprises from about 2 to about 15 weight percent of the photoinitiator.

3. An optical disc as defined by claim 1, wherein the radiation curable composition comprises from about 30 to about 60 weight percent of the first component, from about 30 to about 60 weight percent of the second component, from about 5 to about 12 weight percent of the photoinitiator and from about 0.05 to about 0.5 weight percent of the adhesion promoter.

4. An optical disc as defined by claim 1, wherein the first component comprises an alkanediol diacrylate.

5. An optical disc as defined by claim 1, wherein the first component comprises hexanediol diacrylate.

6. An optical disc as defined by claim 1, wherein the second component comprises ethoxylated bisphenol A diacrylate.

7. An optical disc as defined by claim 1, wherein the radiation curable composition further comprises at least one additional reactive acrylate component.

8. An optical disc as defined by claim 7, wherein the additional reactive acrylate component comprises ethoxylated triacrylate, pentaerythritol polyacrylate, isocyanurate mono-, di-, or triacrylate, or mixtures thereof.

9. An optical disc as defined by claim 1, wherein the adhesion promoter comprises an acrylated phosphoric acid or a methacrylated phosphoric acid, or a mixture thereof.

10. An optical disc as defined by claim 1, wherein the radiation curable composition further comprises a flow promoter.

11. An optical disc as defined by claim 10, wherein the flow promoter comprises a reactive silicone (meth)acrylate compound or a high molecular weight acrylic compound and is included in an amount of from about 0.01 to about 0.5 weight percent.

12. An optical disc as defined by claim 1, wherein the photoinitiator comprises a benzophenone, an acetophenone, or a mixture thereof.

13. An optical disc as defined by claim 1, wherein the substrate is formed of polycarbonate.

14. An optical disc as defined by claim 1, wherein the coating is formed on the outer surface of the disc.

15. An optical disc as defined by claim 14, wherein the coating is cured and is provided with ink printing.

16. An optical disc as defined by claim 1, wherein the substrate is formed with pits and lands and the optical disc is an optical storage disc.

17. An optical disc as defined by claim 1, wherein the radiation-curable composition from which the coating is formed has a viscosity of from about 10 to about 200 cps and is effectively curable using an ultraviolet radiation source operating at a wavelength of from about 240 to about 450 nm and an energy of from about 200 to about 450 mJ/cm$^2$ in less than about 2 seconds to provide a cured coating having a pencil hardness of at least B.

18. An optical disc as defined by claim 1, wherein the radiation-curable composition from which the coating is formed has a viscosity of from about 10 to about 200 cps and is effectively curable using an ultraviolet radiation source operating at a wavelength of from about 240 to about 450 nm and an energy of from about 200 to about 450 mJ/cm$^2$ in less than about 2 seconds.

19. An optical disc as defined by claim 1, wherein the radiation-curable composition comprises from about 30 to about 70 weight percent of the second component.

20. An optical disc as defined by claim 1, wherein the radiation-curable composition comprises from about 30 to about 60 weight percent of the second component.

21. An optical disk, comprising a substrate, a metallized layer and a coating, the coating being formed from a radiation-curable composition comprising from about 30 to about 70 weight percent of a first component selected from the group consisting of alkanediol diacrylates, alkanediol dimethacrylates, alkene glycol diacrylates, alkene glycol dimethacrylates, and mixtures thereof, from about 5 to about 40 weight percent of an acrylate- or methacrylate-containing alkoxylated bisphenol A compound as a second component, from about 10 to about 50 weight percent of an additional reactive acrylate component comprising ethoxylated triacrylate, pentaerythritol polyacrylate, isocyanurate mono, di- or triacrylate, or a mixture thereof, from about 2 to about 15 weight percent of a photoinitiator, and from about 0.01 to about 1 weight percent of an adhesion promoter comprising acrylated sulfonic acid, methacrylated sulfonic acid, acrylated sulfonic acid anhydride, methacrylated sulfonic acid anhydride, acrylated carboxylic, methacrylated carboxylic acid, acrylated carboxylic acid anhydride, methacrylated carboxylic acid anhydride, acrylated phosphoric acid, methacrylated phosphoric acid, or mixtures thereof.

22. An optical disc as defined by claim 21, wherein the radiation curable composition comprises from about 30 to about 60 weight percent of the first component, from about 10 to about 30 weight percent of the second component, from about 20 to about 40 weight percent of the additional reactive acrylate component, from about 5 to about 12 weight percent of the photoinitiator and from about 0.05 to about 0.5 weight percent of the adhesion promoter.

23. An optical disc as defined by claim 1, wherein the radiation-curable composition comprises from about 20 to about 50 weight percent of the additional reactive acrylate component.

24. An optical disc as defined by claim 21, wherein the radiation-curable composition comprises from about 20 to about 40 weight percent of the additional reactive acrylate component.

* * * * *

UNITED STATES PATENT AND TRADEMARK OFFICE
CERTIFICATE OF CORRECTION

PATENT NO. : 6,582,884 B1
DATED : June 24, 2003
INVENTOR(S) : Timothy E. Myers

It is certified that error appears in the above-identified patent and that said Letters Patent is hereby corrected as shown below:

Column 7,
Line 57, change "acrylated carboxylic acid methacryl-" to
-- acrylated carboxylic acid, methacryl- --.

Column 10,
Line 8, change "claim 1" to -- claim 21 --.

Signed and Sealed this

Ninth Day of December, 2003

JAMES E. ROGAN
*Director of the United States Patent and Trademark Office*